F. B. KEALL.
SUBMARINE AND OTHER NAVIGABLE VESSEL.
APPLICATION FILED DEC. 26, 1917.
1,277,943.
Patented Sept. 3, 1918.
3 SHEETS—SHEET 1.
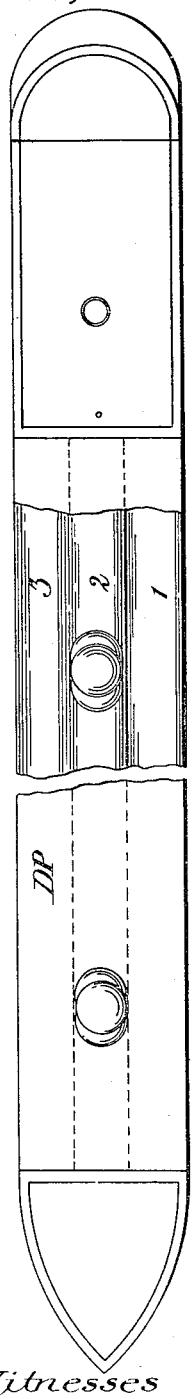
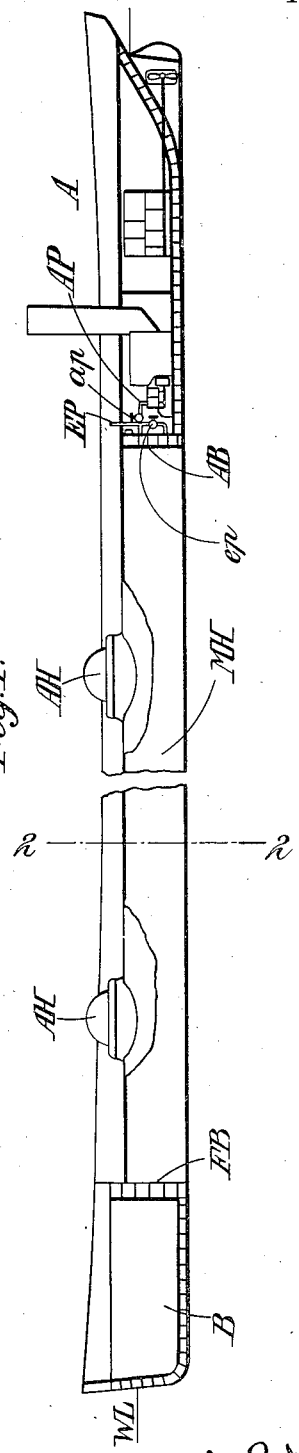
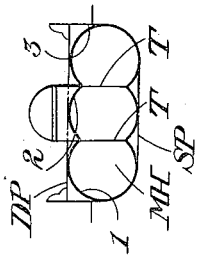
Inventor,
F. B. Keall

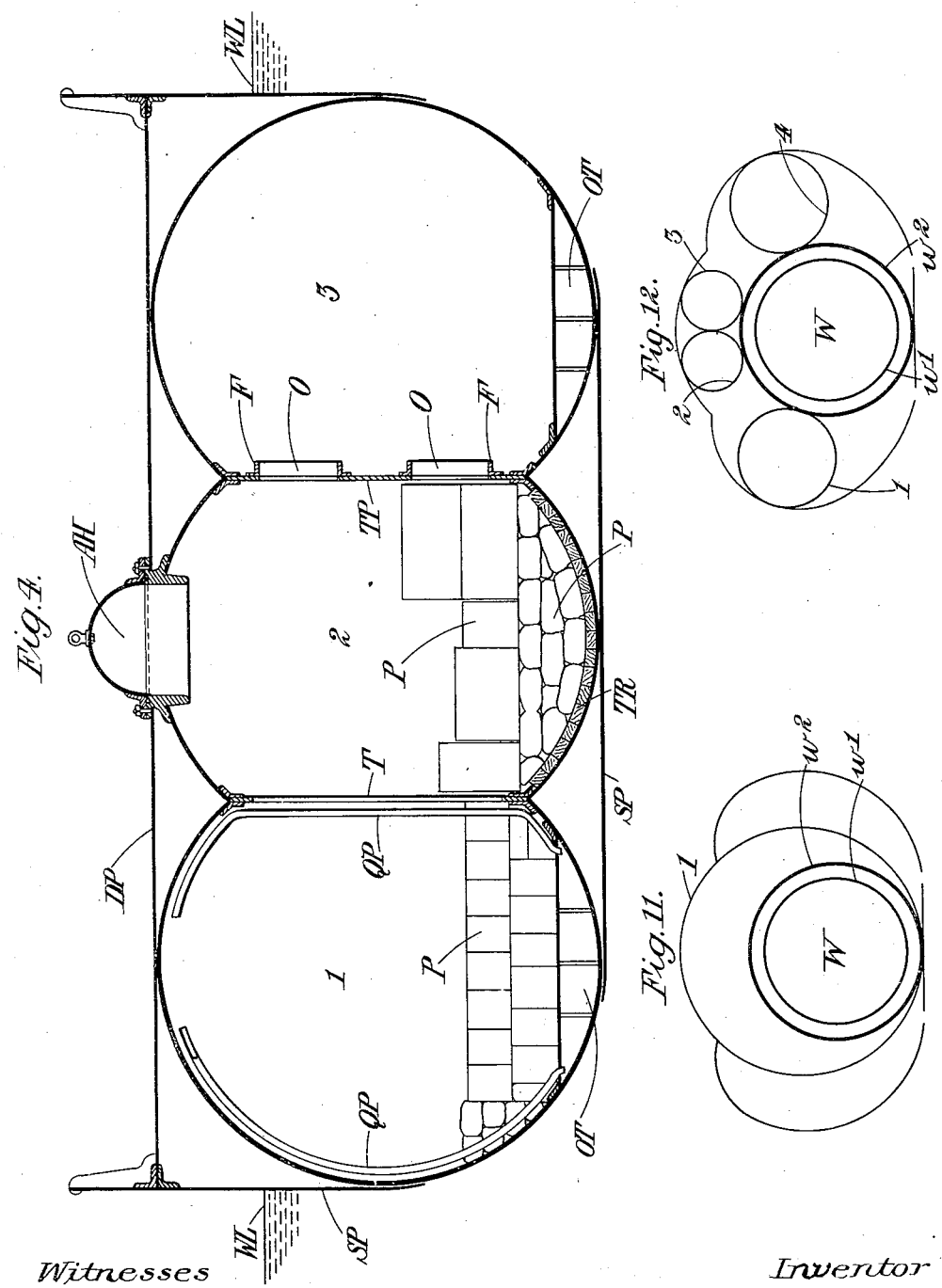

F. B. KEALL.
SUBMARINE AND OTHER NAVIGABLE VESSEL.
APPLICATION FILED DEC. 26, 1917.
1,277,943.
Patented Sept. 3, 1918.
3 SHEETS—SHEET 3.
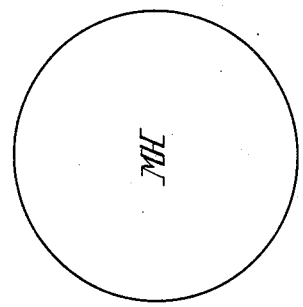
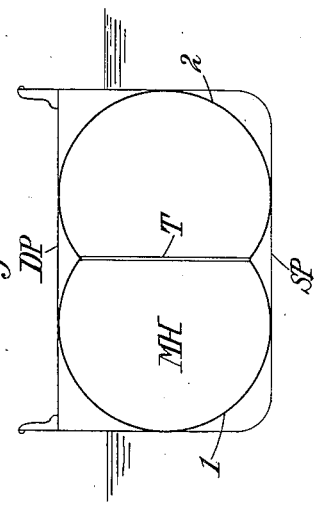
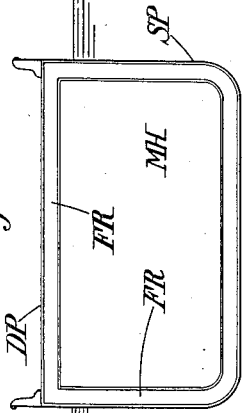
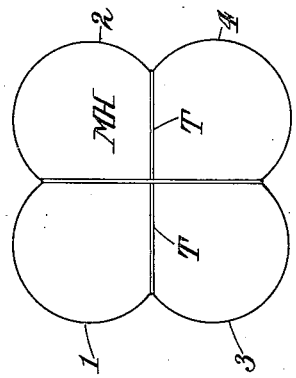
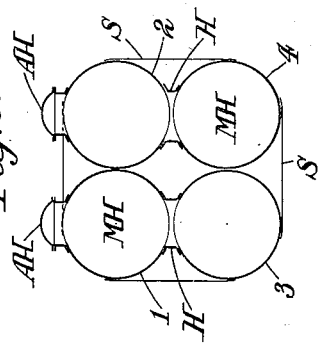
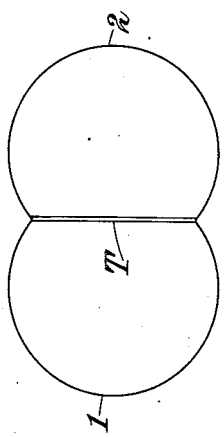
Witnesses
Jesse B. Heller
F. B. Fleming
Inventor
F. B. Keall
by Bakewell, Byrnes, Parmelee
Attys

UNITED STATES PATENT OFFICE.

FRANK BYCROFT KEALL, OF LEICESTER, ENGLAND.

SUBMARINE AND OTHER NAVIGABLE VESSEL.

1,277,943.    Specification of Letters Patent.    Patented Sept. 3, 1918.

Application filed December 26, 1917. Serial No. 208,723.

*To all whom it may concern:*

Be it known that I, FRANK BYCROFT KEALL, a subject of the King of England, residing at Leicester, England, have invented certain new and useful Improvements in Submarine and other Navigable Vessels, of which the following is a specification.

This invention relates to submarine and other navigable vessels. Submarines are subject, particularly when entirely and deeply submerged, to an exterior hydrostatic pressure which puts great stresses upon their structure; when incompletely or not deeply submerged they are subject also to dynamic and sagging and hogging stresses arising from the waves. These considerations have necessitated heavy and costly forms of hull construction, not only in submarines but also in surface vessels, the weight of which construction is a very important factor in minimizing to an unprofitable degree the share of total displacement available in ships for the carrying of cargo.

The object of the present invention is to enable submarine or submersible or even non-submersible cargo-carrying vessels to be produced and operated economically.

Accordingly this invention comprises the combination for the purpose hereinafter described with the hull structure in a submarine or other vessel navigable in water (whether self-propelled or of the "dumb barge" type) of a body of air or gas that is sealed in cargo-holds or other closed chambers of the ship, is at a pressure greater than atmospheric pressure, and is employed to occupy and completely fill until the hold or chamber is reopened, all the space in for instance a cargo-hold that is not occupied by solid material and to thus constitute a filling which will impart to the combination an ability to resist the stresses tending to deform it (*e. g.* when submerged or in a seaway) which is greater than the structure of the hull or craft alone would possess were the air or gas absent.

One purpose of this invention is that a high ratio of dead-weight (*i. e.* cargo) capacity to displacement shall be obtainable safely and with economy, by reducing the weight cost and strength of the rigid hull structure to a degree not heretofore practicable in vessels employed in rough water or as submarines or even in non-submersible vessels for smooth-water service and by employing compensatorily the air or gas under pressure as aforesaid to maintain the necessary safe resistance of the combination of which the light hull structure forms a part to the stresses to which it is liable in a seaway, or when submerged, or even to the stresses to which a hull of light scantling is exposed in smooth-water service when not subjected to wave-action, and by utilizing for dead-weight capacity in the ship the share of displacement thus released.

The combination aforesaid can be built to be completely submersible, though it would then travel at the surface in smooth water and for docking and undocking. Or it can be built of very light scantling for surface running alone.

The internal pressure of the gas or air not only stiffens the hull against the collapse of its cross-section but also stiffens the hull against longitudinal and general deformation.

The pressure within the hull can be greater than that of the external hydrostatic pressure acting on the submerged hull.

An improved vessel constructed according to the present invention may be of cylindrical cross-section, or may be a structure of tubes that are parallel to one another and more or less cylindric, and that open into or are connected with one another, *e. g.* along their sides; if they open into one another they may be strengthened at the opening, by ties extending across it. The ties may be part of a deep girder or keelson imparting longitudinal stiffness to the vessel.

In the accompanying drawings—

Figure 1 illustrates diagrammatically in longitudinal central section a vessel according to the present invention;

Fig. 2 is a transverse section on the line 2—2 of Fig. 1;

Fig. 3 is a plan of the vessel which, in Fig. 1, is shown in side elevation; part of the deck is removed in Fig. 3;

Fig. 4 is a transverse section of a similar vessel drawn to a larger scale than that of Figs. 1 and 2, and Figs. 5, 6, 7, 8, 9, 10, 11 and 12 are diagrammatic transverse sections of other forms of navigable vessel capable of being strengthened by air according to the present invention.

In the construction illustrated in Figs. 1, 2 and 3, the vessel has a single main hold MH for cargo within the interior of a shallow structure constituted by three tubes 1, 2 and 3 that are parallel to one another, the tubes 1 and 3 opening into the central tube 2 along their sides, the tubes being strengthened across the openings by ties T which extend across them in the manner indicated in Fig. 2. The main hold MH is continuous from the forward bulkhead FB to the after bulkhead AB and the bow portion B and the after portion A may be of the usual construction and of ordinary scantling, while the plating of the tubes 1, 2 and 3 and the skin- and deck-plating SP and DP in way of these tubes may be much lighter than is usual. Air-tight hatches AH are provided and in the engine-room is an air-compressor of any suitable type from which an air-supply pipe AP leads into the main hold to keep it full of air under pressure greater than that of the atmosphere and preferably greater than that of the external hydrostatic pressure acting on the submerged portion of the hull. EP is an exhaust-pipe for discharging air from the main hold before the air-tight hatches are opened. *ap* and *ep* are suitable valves on the air-supply pipe AP and exhaust-pipe EP respectively.

If desired, the compartment in the bow B, as well as the main hold MH can be filled with compressed air.

With reference to Fig. 4, the three tubes 1, 2 and 3 open into one another as in the case of Fig. 2. The tubes 1 and 3 have each a double bottom which constitutes an oil-tank OT or a ballast-tank, and equalizing-pipes such as QP in the tube 1, are provided to afford free communication between the tank OT and the upper interior of the tubes so that the pressure within the oil-tanks or ballast-tanks shall always be equal to the pressure of the air in the hold. Packages of cargo in the hold are indicated diagrammatically by the shapes P.

The tube 1 opens into the tube 2 by high openings, almost equal in height to the total length of the tie T. As an alternative the structure of the tubes 2 and 3 is tied where they meet, by a tie-plate or web TP in which there are openings O strengthened by flanges F.

An air-tight hatch AH is shown upon the top of the central tube. Similar hatches might be placed on the tops of the other tubes, in which case it might not be necessary to provide openings between the tubes 1 and 2 or between the tubes 2 and 3, and tie-plates, such as TP, could then be used devoid of the openings O.

The central tube 2 is shown as being floored with timber TR. But it might have tanks at the bottom, like the tanks OT in the other tubes. But the ballast and oil-fuel arrangements are not of themselves any part of the present invention and may be arranged as may be desired by the designer of the vessel. The line WL in Figs. 1 and 4 may be the load water-line.

Fig. 5 shows the cross-section of a vessel taken through the main hold MH which is stiffened by ordinary framing indicated purely diagrammatically at FR and is intended to be kept full of air under a pressure greater than that of the external hydrostatic head.

Fig. 6 is the cross-section of a vessel in which the main hold MH is made up of two tubes 1 and 2 opening into one another along the longitudinal central vertical plane of the vessel and there tied by cross-ties T. The main hold is in this case intended to be filled with air under pressure as in the preceding example.

Fig. 7 is the cross-section of a vessel of completely circular form not requiring to be transversely stayed against bursting pressure, in which the main hold or cargo-space MH is to be filled with air under pressure, and Fig. 8 is the cross-section of a vessel made up of two tubes 1 and 2 such as are employed in Fig. 6 but unprovided with the skin-plating SP and deck-plating DP which appear in Fig. 6.

Fig. 9 shows a further alternative vessel to be charged with air according to the present invention. It is constituted by two superposed pairs of tubes as shown, the tubes 1 and 2 of the upper pair having at suitable intervals in their length hatchways H, which may be circular, opening into the tubes 3 and 4 of the lower pair. On top of the tubes 1 and 2 and at corresponding intervals are suitable air-tight hatches AH; the four tubes are kept in proper positional relationship to one another by straps S riveted to them.

Fig. 10 shows diagrammatically another method of uniting the four tubular structures 1, 2, 3 and 4, which are little more than half-tubes in transverse sections so that they give a single cargo-hold and tied across by ties T.

The forward and after ends of vessels having any of the various cross-sections which are shown in Figs. 5–10 may be fined in form as may be desired. In the case of any of the vessels shown in Figs. 6 to 10 the tubes may be terminated by a flat forward bulkhead and a flat after bulkhead like the bulkheads FB and AB in Fig. 1 and ship-shaped or spindle-shaped ends may extend forward and aft from those bulkheads also as in Fig. 1 and may be specially strengthened if desired, particularly if they are not to be filled with compressed air.

Fig. 11 shows in transverse section a double-walled closed working-chamber W in a submarine; the inner wall of this working-chamber is $w^1$ and the outer wall $w^2$. This working-chamber incloses the crew, and if desired some or all of the propelling-apparatus and equipment of the vessel. It is intended to be filled with air at ordinary atmospheric pressure.

The necessary displacement volume is afforded by the outer tube 1 and this outer tube, except for the interior of the working-chamber W, is charged with air at a pressure greater than atmospheric pressure to impart to the outer tube an ability to resist the stresses tending to deform it which is greater than the outer tube would possess were the said air absent. Not only is the total weight of this submarine lightened by reason of the fact that the tube 1 can be of lighter scantling than is usual because of the presence of the compressed air in it, but the working-chamber can be made much smaller than if it were employed to produce buoyancy, and the smaller it is made the less will be its weight.

The reduction in scantling of the tube 1 and the reduction in size, and also in scantling, of one or both of the walls of the working-chamber W, jointly contribute to a considerable reduction in total hull weight without involving a reduction of strength, for the compressed air charge compensates for the reduction in scantling.

In Fig. 12 which, like Fig. 11, is the cross-section of a submarine, the double-walled working-chamber W is to inclose, as in the preceding example, the crew and the propelling machinery and equipment of the vessel. The working-chamber is combined with four tubes numbered respectively 1, 2, 3 and 4 which form floats connected by any suitable means to the working-chamber. These floats are strengthened according to the present invention by being charged with air at a pressure greater than atmospheric pressure and being of small diameter and thus strengthened they may be of extremely light scantling. The displacement of the two vessels illustrated in cross-section in Figs. 11 and 12 is identical.

The high pressure air in the tube 1 of Fig. 11 or in the tubes 1, 2, 3 and 4 of Fig. 12, is available for the crew in the working-chambers W. An air-pump might be provided, operated mainly by the compressed air to deliver air from the tube 1 (Fig. 11) or 1, 2, 3 or 4 (Fig. 12) into the working-chamber at atmospheric pressure and out of it again into the compression-spaces 1 or 1, 2, 3 or 4. Or, if desired, foul air from the working-chamber could be blown overboard by fresh air procured from the compression-spaces by releasing some of the air therefrom into the working-chamber.

Air-locks could be provided so that the compression-spaces, under suitable circumstances, might be entered.

It is to be understood that the body of air admitted to the holds according to the present invention not only fills the whole interior of the hold or compartment when it is otherwise empty, or fills the whole of the interior of the hold save the volume occupied by the cargo, when the hold is being used for freight, but is of constant volume, although its pressure may be varied if desired; and therefore my invention differs from inventions previously known to me, in which the internal and external pressures on a submerged hull have been balanced by allowing the hydrostatic head on the outside to act on a body of water within the hull and in free communication with the sea, whereby air imprisoned in the hull has been compressed and reduced in volume by the water following it up, until the pressure of the external head has become balanced.

What I claim as my invention and desire to secure by Letters Patent is:—

1. A vessel navigable in water comprising an air-tight chamber lengthwise in said vessel and having walls which constitute it a hollow longitudinal girder therein, means for the entry of cargo into said girder and its exit therefrom, and a body of air or gas that is sealed in said girder at a pressure greater that atmospheric pressure, is a stiffener for said girder and is employed to impart to the vessel an ability to resist the hogging and sagging stresses tending to deform it which is greater than the vessel would possess were the said air or gas absent, substantially as described.

2. A vessel navigable in water comprising an air-tight chamber lengthwise in said vessel and of a cross-section made up of substantially circular curves and having walls which constitute it a hollow longitudinal girder therein, means for the entry of cargo into said girder and its exit therefrom, and a body of air or gas that is sealed in said girder, is at a pressure greater than atmospheric pressure, is a stiffener for said girder and is employed to impart to the vessel an ability to resist the hogging and sagging stresses tending to deform it which is greater than the vessel would possess were the said air or gas absent, substantially as described.

3. A vessel navigable in water comprising an air-tight chamber lengthwise in said vessel and of a cross-section made up of substantially circular curves and having walls which constitute it a hollow longitudinal girder therein, means for the entry of cargo into said girder and its exit therefrom, and a body of air or gas that is sealed in said girder, is at a pressure greater than atmospheric pressure, is a stiffener for said girder and is employed to impart to the vessel an ability to resist the hogging and sagging stresses tending to deform it which is greater than the vessel would possess were the said air or gas absent, combined with a supplemental tubular working chamber, substantially as described.

In testimony whereof I affix my signature.

FRANK BYCROFT KEALL.